UNITED STATES PATENT OFFICE.

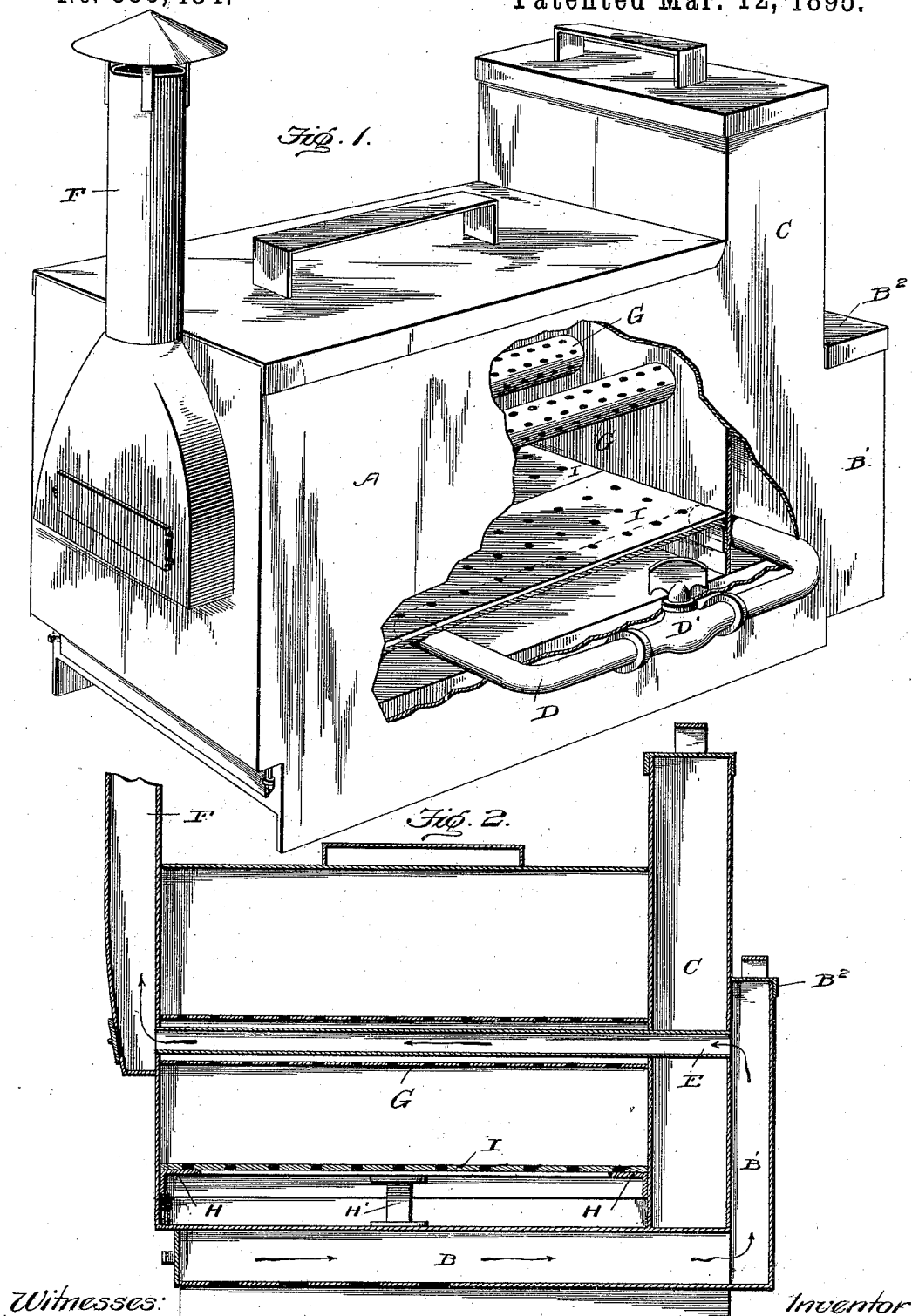

HENRY FREDRICK WINKELMANN, OF JOHNSON, NEBRASKA.

ANIMAL-FOOD COOKER.

SPECIFICATION forming part of Letters Patent No. 535,434, dated March 12, 1895.

Application filed November 3, 1894. Serial No. 527,807. (No model.)

*To all whom it may concern:*

Be it known that I, HENRY FREDRICK WINKELMANN, a citizen of the United States, residing at Johnson, Nemaha county, Nebraska, have invented certain new and useful Improvements in Animal-Food Cookers, of which the following specification is a full, clear, and exact description, reference being had to the accompanying drawings, forming part thereof, in which—

Figure 1 is a perspective view of the apparatus, part being broken away, and Fig. 2 is a longitudinal central vertical section thereof.

The object of the invention is to provide an animal food cooker, in which provision is made for first steaming the grain or other food, then admitting the hot water to cook the same; the combustion flues being returned from a smoke box through the food compartment to supply additional heat for the cooking operation. A further object is to protect these flues so that they will not burn or scorch the food being cooked and also to space the food above the bottom of the food compartment to prevent burning at this point.

The invention will be first described in detail, and then specifically pointed out in the claims.

A represents the main tank or food compartment and B is a furnace thereunder and extending the full length of its bottom. The rear end or combustion chamber of the furnace opens into a smoke box B' having a suitable cover B² or door at any desired part. Between the smoke box B' and the adjacent end of the food compartment A is arranged a vertical water reservoir C, which extends upward to a greater height than said food compartment; the lower ends of the reservoir and compartment A being connected by an external pipe D, provided with a suitable valve D' to permit water to pass from the reservoir into the compartment A and rise to any desired height therein.

Flues E E extend from the smoke box through the water reservoir C and compartment A to a smoke stack or outlet flue F located on the front end of the compartment A. These flues are located at about the middle of said compartment and are protected therein by concentric foraminated tubes G so as not to burn the food and yet supply additional heat for cooking the contents of the compartment A.

Around the interior of the compartment A is placed an angle iron H, upon the horizontal flange of which is supported the two foraminated plates I I, which form the false bottom of the compartment A. The space beneath the false bottom constitutes a steam chamber the use of which will be hereinafter set forth. The plates I I are supported at the middle portions of their abutting edges by a T-shaped support H'.

The compartment A is provided with a cover A' and the reservoir has a cover C'.

The operation is as follows: The reservoir is filled with water and the fire kindled; a small quantity of water being also admitted into the bottom of the compartment A below the foraminated plates upon which the grain or other food rests. The water in compartment A and reservoir C will soon be heated, the steam from water in the compartment A rising up through the foraminated plates and grain supported thereon. This steaming is continued until the grain or food has swelled sufficiently whereupon the cock D' is opened and the boiling water from the reservoir is admitted into the compartment A and the food cooked for any desired length of time.

The perforated tubes G prevent the food from being scorched or burned and yet allow the water to come in contact with the hot flues E E by which it is highly heated.

It will be seen that the heat from the furnace is utilized to the greatest extent since it not only directly heats the bottoms of the compartment A and reservoir C, but also heats the interior thereof.

The cooker will in use be mounted on a masonry support in the usual manner.

Having thus described my invention, what I claim is—

1. An animal food cooker comprising the food compartment, a furnace thereunder, return flues extending through the middle portion of the compartment to a stack or offtake at the front end thereof, foraminated tubes inclosing said flues, and a foraminated false bottom in the compartment below the said flues, the space beneath the false bottom forming a steam chamber substantially as set forth.

2. An animal food cooker comprising a food compartment, a furnace thereunder, a water reservoir at one end of the compartment and having a valved connection with the bottom portion thereof, return flues extending through the water reservoir, and through the middle portion of said compartment to an offtake or stack at the front end thereof; foraminated tubes inclosing said flues in the food compartment, and a sectional removable foraminated false bottom in the compartment below the return flues, the space beneath the false bottom forming a steam chamber substantially as set forth.

HENRY FREDRICK WINKELMANN.

Witnesses:
J. C. WRIGHT,
C. C. STONE.